May 7, 1940.　　　J. T. DICKSON　　　2,199,784
INDICATOR
Filed March 10, 1937　　2 Sheets-Sheet 1
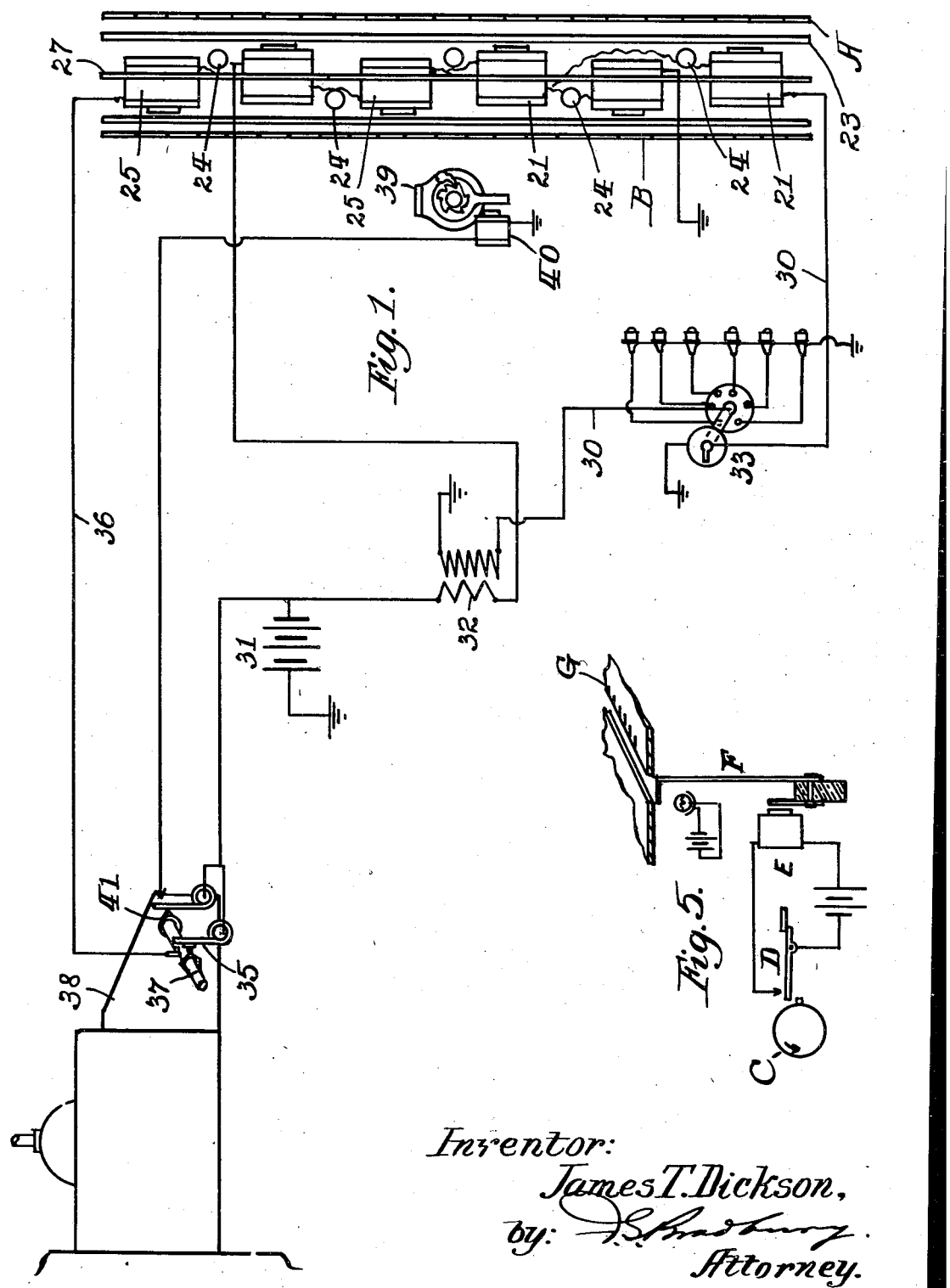
Inventor:
James T. Dickson,
by: [signature]
Attorney.

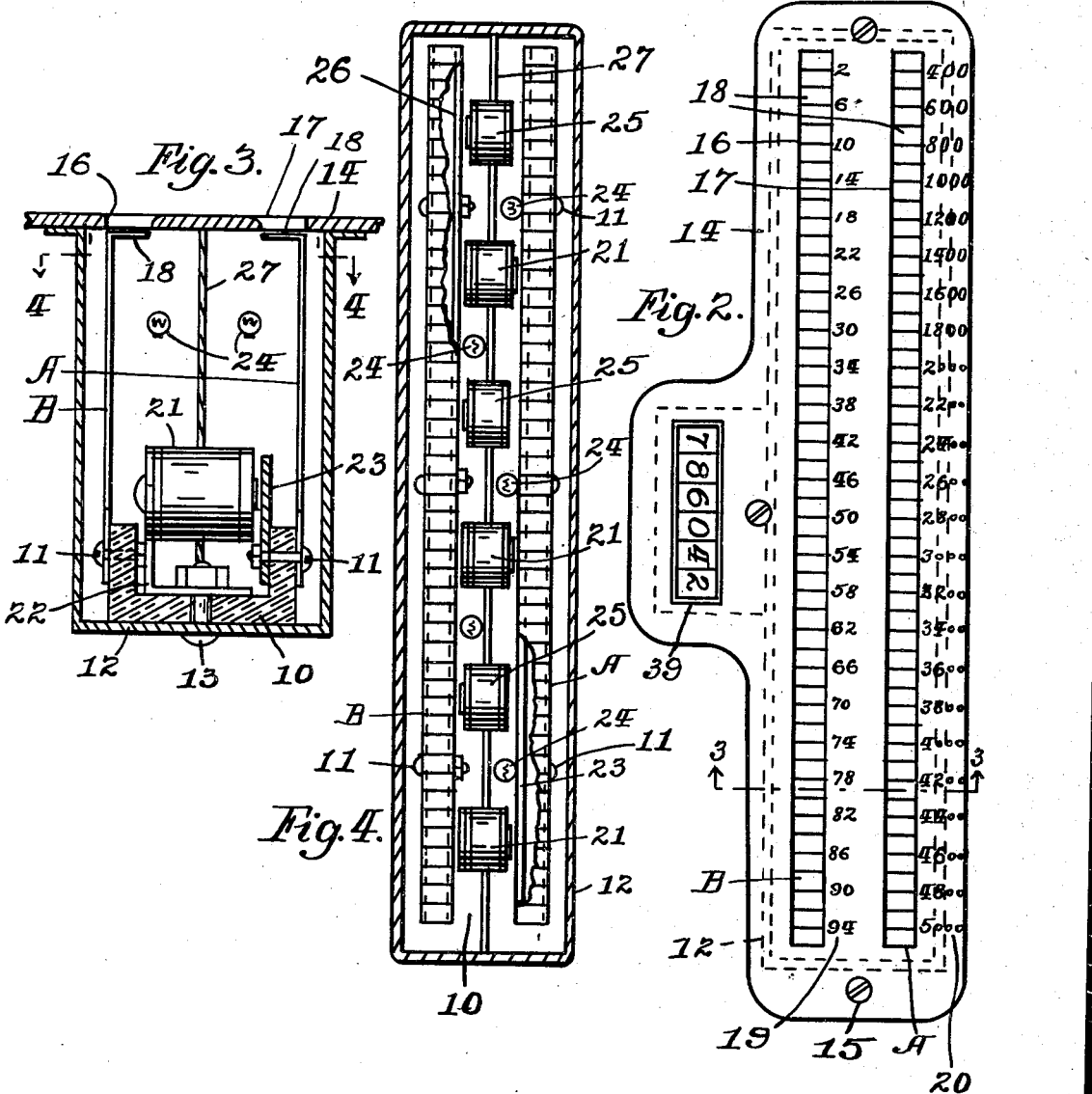

Patented May 7, 1940

2,199,784

UNITED STATES PATENT OFFICE 2,199,784

INDICATOR

James T. Dickson, Los Angeles, Calif., assignor to John D. Fredericks, Jr., Los Angeles, Calif.

Application March 10, 1937, Serial No. 130,126

3 Claims. (Cl. 175—183)

My invention employs an operating principle which depends upon resonance, that is if a reed tuned to vibrate a given number of times per minute is subjected to the influence of a body vibrating at substantially the same rate, the reed will be thrown into considerable vibration. In the present instance the operating means is represented by a series of current impulses in an electrical circuit which are impressed upon an electromagnet. This magnet conveys a series of impulses to a bank of reeds which are tuned individually to respond respectively to the rate of current impulses imparted. Thus by associating a suitable current make and break means with the driving mechanism of a vehicle such as its transmission mechanism or with the ignition circuit of the gas engine which is employed to propel the vehicle, the reeds may be used to indicate the relative speed at which the vehicle is moving or the relative speed of rotation of the crank shaft of its engine.

The primary object of my invention is the production of simple and effective means for indicating at a remote distance through the use of a series of interruptions of an electric circuit the speed at which an object is moving. A favorable use of the invention is to indicate the speed at which a vehicle is traveling and simultaneously the relative speed at which the driving motor of the vehicle is revolving. Among further objects is the production of a device of its kind which will not easily get out of order and which is inexpensive. My invention also contemplates a device of its kind which is adapted for both of said uses simultaneously or for either use when unaccompanied by the other when desired.

In the accompanying drawings forming part of this specification, Fig. 1 is a diagrammatic plan of one form of my invention showing its application for use for indicating the speed at which a motor vehicle is traveling and the speed of rotation of the gas engine which is used to propel the vehicle; Fig. 2 is a plan of my improved indicator which is employed with my invention; Fig. 3 is a section taken on line 3—3 of Fig. 2; Fig. 4 is a section taken on line 4—4 of Fig. 3, and Fig. 5 is a diagrammatic view illustrating the basic principle employed by my invention.

Referring to Figs. 2 to 5 inclusively, I employ two sets of reeds A and B, arranged in parallel rows at a suitable distance apart and made of tempered spring steel or other suitable material and mounted rigidly upon a suitable bridge 10, made of rubber or other suitable resilient material by bolts 11. The supporting bridge 10 is rigidly mounted in a suitable receptacle 12 by bolts 13 or other suitable means, said receptacle being provided with a face plate 14 removably secured thereto by screws 15 or other suitable means and provided with sight openings resembling longitudinally disposed parallel slots 16 and 17 through which the indicating reeds are visible. The upper ends of the reeds are turned inwardly to normally produce shutters 18 which close the sight openings unless the reeds are vibrating, in which event artificial light from within the casing is released. Two series of indicating digits 19 and 20 constituting scales adjacent to slots 16 and 17, serve to indicate which reeds are caused to vibrate.

The reeds are carefully calibrated as to thickness and size, each reed being tuned for some particular number of vibrations per minute, and the reeds are arranged progressively as to harmonics. Tuning of the reed however cannot be very sharp, vibration beginning at about two per cent below the exact value to which the reed is tuned and reaching a maximum at the exact value and extending above about two per cent of that value. Therefore more than one reed is usually in vibration at the same time and from the amplitude of vibration and respective lengths of the bands formed across the scale openings, substantially exact speed may be estimated. Vibration of the reeds is produced by a series of electromagnets there being a series for each set. For the set of reeds A a series of electromagnets 21 are rigidly mounted upon a support 22 which in turn is secured to the bridge 10 by bolts 13. A single armature 23 which is disposed to vibrate through the action of these electromagnets is rigid in itself but flexibly mounted upon the elastic bridge 10 by the bolts 11. This armature extends along the side of and close to the set of reeds A so as to convey vibrations most effectively thereto through their bolt connections. The coils of the electromagnets can be connected in series or series multiple as desired. As shown they are connected in series and when energized by the rapid make and break of their circuit vibrate the armature plate 23 to which vibrations the adjacently disposed reeds respond in synchronism and indicate the speed of an object. Artificial light may be produced in the receptacle 12 by a plurality of electric light bulbs 24 which receive their energizing current from any suitable source. Thus when the energizing armature is made to vibrate by the interrupted current passing through the electric coils, the reeds respond in sympathy with the action of the armature. The reed or reeds thus responding vibrate their shutters transversely across the sight opening 17 in the face plate and release light from the lamp bulbs 24, thus indicating by the scale of digits 20 the speed of current interruptions and the movement of an object.

It has been found that by varying the length and thickness of the reeds and the amount of loading under the bent over portions, it is possible to tune them for from a low number of vibrations to a very large number per minute. Where the range is greater than one octave there will be a slight indication on the scale at higher or lower points due to harmonics but nevertheless the brightest indication predominates and is easily determined.

As shown the dial produced by the scale of digits 20 is adapted to indicate the speed of a gas engine while the scale of digits 19 is adapted to indicate the speed at which a vehicle is moving. In like manner a set of electromagnets 25 and vibrating armature 26 are provided to influence the vibration of the set of reeds B and release light from the lamp bulbs 24 through sight opening 16 and thus indicate the speed of current interruptions. Electromagnets 25 likewise are secured to the bridge by bolts 13 and the armature plate 26 is secured to the bridge 19 by bolts 11 in close but spaced association with the set of reeds B. A suitable shield 27 is provided between the two sets of reeds to cut out unwanted harmonics.

When desired the electric light 24 used for producing artificial light in the indicator receptacle can be of different colors to help distinguish between varying speeds indicated by the device. For instance at the extreme ends of the scale the color of light reflected through the sight opening when the shutters vibrate can be white while at a point midway between the ends signifying safe speed can be green or other distinguishing color.

In Fig. 1, I have shown diagrammatically the indicator represented by the set of reeds A and electromagnets 21 connected with the primary ignition circuit 30 of a six cylinder four cycle gas engine such as of a motor driven vehicle whereby there are three makes and breaks in the circuit to every revolution of the crank shaft. 31 indicates the battery source of current, 32 the ignition coil which is included in the primary circuit and 33 the distributor. Thus the interruptions in the current from the battery 31 and produced by the distributor are conveyed to the electromagnets 21 and armature plate 23 and vibrate the tuned reeds A which indicate on the dial 20 the number of current interruptions and consequent speed of the engine. The make and break means thus utilized is the make and break caused by the distributor. Other make and break means may be employed located at any remote distance from the indicator within the spirit of my invention. The make and break means resorted to for operating the speed indicator produced by the set of reeds B and associated electromagnets consists of an interrupter 35 for current received from battery 31 and passing by circuit 36 through the coils of electromagnets 25, thus causing the set of reeds B to respond and indicate the speed of the interrupter actuator. As shown diagrammatically said interrupter 35 is actuated by the usual speed take off shaft 37 from the transmission 38 of the vehicle, whereby the speed at which the vehicle travels is indicated.

Thus both the speed of revolution of the engine and speed of travel of the vehicle driven by said engine are indicated by my improved indicator. In connection with the indicator I have shown diagrammatically the usual recorder or odometer 39 for the vehicle, built into the face plate 14 of the indicator but actuated by a magnetic ratchet 40 which receives its current impulses by a circuit make and break switch 41, the latter also being associated with and actuated by the take off shaft 37 from the transmission 38.

The basic principle involved in my improvement is graphically illustrated in Fig. 5, in which C indicates a movable element the speed of which it is desired to indicate from any suitable distance. D indicates any suitable circuit breaker which is actuated at regular frequency with that of the movable element. E indicates any suitable electromagnet the coil of which is included in circuit with said circuit breaker and the armature of which is vibrated by the action of interrupting the current passing through said coil. F indicates a series of vibratory reeds to which the vibration from the armature is transmitted and which are tuned in series so that an individual reed or a limited number of reeds will respond harmonically to the vibrations of the armature as produced by the interrupted current which is controlled by the circuit breaker and indicate by a scale G the particular reed or reeds thus effected and the accompanying speed of the movable element.

In accordance with the patent statutes, I have described the principles of operation of my invention together with the construction thereof which I now consider to represent the best embodiment thereof but I desire to have it understood that the apparatus shown is only illustrative and that the invention can be carried out by other means and applied to uses other than those above set forth within the scope of the following claims.

I claim:

1. A frequency meter of the vibrating type, comprising, in combination, a plurality of sets of tuned reeds arranged side by side and progressively graduated to simultaneously respond independently of one another to a scale of vibrations, each member of each set having a shutter on its free end, a bridge upon which said sets of reeds are mounted, a casing in which said reeds and said bridge are supported having sight openings normally closed by said shutters and opened by the stimulated action of the reeds, a shield between the sets of reeds for cutting out unwanted harmonics, and a scale adjacent to each sight opening showing characteristics of the stimulated reeds.

2. In combination with the ignition device of an internal combustion engine having an electrical circuit by which current impulses peculiar to the ignition device are produced in synchronism with the speed of the engine, and the transmission mechanism of a vehicle having an electrical current make and break circuit connected with and operated in synchronism with the operation of said transmission mechanism to produce current impulses peculiar to the operation of the transmission mechanism, and a frequency meter connected with said circuits and having separate sets of responsive vibrating reeds adapted to simultaneously indicate the characteristic impulses produced by either of said circuits.

3. In combination with a plurality of electrical circuits, each circuit being adapted to produce current impulses peculiar to the operation thereof, a frequency meter connected with said circuits and having separate sets of responsive vibrating reeds adapted to simultaneously indicate the respective characteristic impulses produced by each of said circuits, and shielding means between the sets of said reeds for preventing unwanted harmonics.

JAMES T. DICKSON.